United States Patent
Yamasaki

(10) Patent No.: US 10,052,704 B2
(45) Date of Patent: Aug. 21, 2018

(54) ELECTRIC DISCHARGE MACHINE WITH ROTARY TABLE

(71) Applicant: FANUC Corporation, Yamanashi (JP)

(72) Inventor: Mizuho Yamasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 254 days.

(21) Appl. No.: 14/681,950

(22) Filed: Apr. 8, 2015

(65) Prior Publication Data

US 2015/0290734 A1 Oct. 15, 2015

(30) Foreign Application Priority Data

Apr. 9, 2014 (JP) ................................. 2014-080157

(51) Int. Cl.
*B23H 11/00* (2006.01)
*B23H 1/00* (2006.01)
*B23H 7/26* (2006.01)

(52) U.S. Cl.
CPC .............. *B23H 11/003* (2013.01); *B23H 1/00* (2013.01); *B23H 7/26* (2013.01)

(58) Field of Classification Search
CPC ........... B23H 11/003; B23H 1/00; B23H 7/26
USPC ................................... 219/69.11, 69.14, 69.2
See application file for complete search history.

(56) References Cited

U.S. PATENT DOCUMENTS

| | | | | |
|---|---|---|---|---|
| 4,469,993 A | * | 9/1984 | Swanson | G05B 19/39 |
| | | | | 198/810.01 |
| 4,899,998 A | * | 2/1990 | Teramachi | B23Q 1/522 |
| | | | | 269/63 |
| 4,960,971 A | * | 10/1990 | Kawanabe | B23H 7/02 |
| | | | | 219/69.12 |
| 5,597,590 A | * | 1/1997 | Tanimoto | B23K 26/0823 |
| | | | | 219/121.61 |
| 5,789,835 A | * | 8/1998 | Obara | B23Q 1/4804 |
| | | | | 310/80 |
| 6,339,203 B1 | | 1/2002 | Nakamura et al. | |

(Continued)

FOREIGN PATENT DOCUMENTS

| | | |
|---|---|---|
| CN | 1546951 A | 11/2004 |
| CN | 101259547 A | 9/2008 |

(Continued)

OTHER PUBLICATIONS

Extended European Search Report dated Sep. 3, 2015, corresponding to European Patent Application No. 15160862.7.

(Continued)

*Primary Examiner* — Tu B Hoang
*Assistant Examiner* — Vy Nguyen
(74) *Attorney, Agent, or Firm* — Hauptman Ham, LLP

(57) ABSTRACT

A rotary table device of an electric discharge machine is provided with a face plate on which a workpiece is placed, a power unit that generates a driving force for rotating the face plate, and a speed reducer connected to the power unit and configured to reduce the rotational speed of the power unit. The respective centers of rotation of the power unit and the speed reducer are disposed on one and the same axis, and a rotation detector for detecting a rotational position of the face plate is disposed in a space defined by an outer peripheral portion of the speed reducer and an inner wall of a housing of the rotary table device.

8 Claims, 3 Drawing Sheets

(56) References Cited

U.S. PATENT DOCUMENTS

2008/0220922 A1 9/2008 Katsuma et al.
2015/0053651 A1 2/2015 Yamasaki

FOREIGN PATENT DOCUMENTS

| CN | 201644962 U | * | 11/2010 | ............... B23H 1/00 |
|---|---|---|---|---|
| CN | 102009201 A | | 4/2011 | |
| CN | 102581408 A | | 7/2012 | |
| CN | 103143846 A | | 6/2013 | |
| EP | 2842680 A2 | | 3/2015 | |
| JP | 57-122397 U | | 7/1982 | |
| JP | 3-19656 U | | 2/1991 | |
| JP | 4-2443 A | | 1/1992 | |
| JP | 11-188574 A | | 7/1999 | |
| JP | 2003-25154 A | | 1/2003 | |
| JP | 3862956 B2 | | 12/2006 | |
| WO | 00/024541 A1 | | 5/2000 | |

OTHER PUBLICATIONS

Office Action dated Sep. 8, 2015, corresponding to Japanese Patent Application No. 2014-080157.
Office Action in CN Application No. 201510163265.8 dated Mar. 3, 2017.
Office Action in EP15160862.7, dated Jun. 13, 2018, 9 pp.

\* cited by examiner

ELECTRIC DISCHARGE MACHINE WITH ROTARY TABLE

RELATED APPLICATIONS

The present application claims priority to Japanese Application Number 2014-080157, filed Apr. 9, 2014, the disclosure of which is hereby incorporated by reference herein in its entirety.

BACKGROUND OF THE INVENTION

Field of the Invention

The present invention relates to an electric discharge machine with a rotary table.

Description of the Related Art

A rotary table used in an electric discharge machine is disposed on a workpiece table in a machining tank that is filled with a machining fluid, and a workpiece as an object of electric discharge machining is fixed on a face plate of the rotary table. Since the machining tank in which the rotary table is placed is limited in size, the rotary table should be as compact as possible. Since the workpiece is sometimes secured directly to the workpiece table in the machining tank, moreover, the rotary table should also be lightweight so that an operator can easily attach and remove it.

An example of the rotary table of an electric discharge machine (see Japanese Patent Application Laid-Open No. 2003-25154) will now be described with reference to FIG. 4.

A power unit 2, first pulley 3, and second pulley 4 are set in a rotary table 1. The power unit 2 and the first pulley 3 are disposed on the same axis (C-axis 7) and can rotate synchronously. A belt 5 is stretched between the first and second pulleys 3 and 4 such that the rotation of the power unit 2 can be transmitted to the second pulley 4 through the first pulley 3.

On the other hand, a face plate 6 for securing a workpiece (not shown) is mounted outside the rotary table 1. The face plate 6 and the second pulley 4 are disposed on the same axis (D-axis 8) and can rotate synchronously. Thus, the power unit 2 and the face plate 6 can rotate synchronously.

Further, Japanese Patent No. 3862956 (corresponding to WO2000/024541) discloses a technique on a spindle device of a die-sinking electric discharge machine, capable of minimizing the parts count by disposing units ranging from a power unit to a mounting unit (equivalent to a face plate) on the same straight line.

However, the rotary table disclosed in Japanese Patent Application Laid-Open No. 2003-25154 shown in FIG. 4 has the two axes, the C- and D-axes 7 and 8, which require the use of two bearings (not shown) and a space for securing the bearings. Thus, it is difficult to construct a compact, lightweight rotary table.

According to the technique disclosed in Japanese Patent No. 3862956, moreover, the power unit and the mounting unit are simply arranged in series, so that the axial dimension of the device is inevitably large.

SUMMARY OF THE INVENTION

Accordingly, in consideration of the above-described problems of the prior art techniques, the object of the present invention is to provide a compact, lightweight rotary table device, in which components of a rotary table are arranged differently from their conventional counterparts, and an electric discharge machine with the rotary table device.

In a first aspect of an electric discharge machine with a rotary table according to the present invention, the rotary table comprises a face plate which is disposed in a machining tank and on which a workpiece is placed, and the electric discharge machine comprises a controller configured to control the rotary table to perform electric discharge machining. The rotary table further comprises a power unit configured to generate a driving force for rotating the face plate, a speed reducer connected to the power unit and configured to reduce the rotational speed of the power unit, a shaft to which the face plate is secured and which is connected to the speed reducer, a bearing that supports the shaft and/or the face plate, a rotation detector secured to the shaft and configured to detect a rotational position of the face plate, and a housing that accommodates therein the power unit, the speed reducer, the shaft, the bearing, and the rotation detector. The respective centers of rotation of the power unit and the speed reducer are disposed on one and the same axis, and the rotation detector is disposed in a space defined by an outer peripheral portion of the speed reducer and an inner wall of the housing.

In a second aspect of the electric discharge machine with a rotary table according to the present invention, the rotary table comprises a face plate, which is disposed in a machining tank and on which a workpiece is placed, and the electric discharge machine comprises a controller configured to control the rotary table to perform electric discharge machining. The rotary table further comprises a power unit configured to generate a driving force for rotating the face plate, a speed reducer connected with the face plate, connected to the power unit, and configured to reduce the rotational speed of the power unit, a bearing supporting the face plate, a shaft secured to the bearing, a rotation detector secured to the shaft and configured to detect a rotational position of the face plate, and a housing that accommodates therein the power unit, the speed reducer, the shaft, the bearing, and the rotation detector. The respective centers of rotation of the power unit and the speed reducer are disposed on one and the same axis, and the rotation detector is disposed in a space defined by an outer peripheral portion of the speed reducer and an inner wall of the housing.

A first aspect of a rotary table device for rotating a workpiece according to the present invention comprises a face plate on which the workpiece is placed, a power unit configured to generate a driving force for rotating the face plate, a speed reducer connected to the power unit and configured to reduce the rotational speed of the power unit, a shaft to which the face plate is secured and which is connected to the speed reducer, a bearing that supports the shaft and/or the face plate, a rotation detector secured to the shaft and configured to detect a rotational position of the face plate, and a housing that accommodates therein the power unit, the speed reducer, the shaft, the bearing, and the rotation detector. The respective centers of rotation of the power unit and the speed reducer are disposed on one and the same axis, and the rotation detector is disposed in a space defined by an outer peripheral portion of the speed reducer and an inner wall of the housing.

A second aspect of the rotary table device for rotating a workpiece according to the present invention comprises a face plate on which the workpiece is placed, a power unit configured to generate a driving force for rotating the face plate, a speed reducer connected with the face plate, connected to the power unit, and configured to reduce the rotational speed of the power unit, a bearing supporting the face plate, a shaft secured to the bearing, a rotation detector secured to the shaft and configured to detect a rotational position of the face plate, and a housing that accommodates therein the power unit, the speed reducer, the shaft, the bearing, and the rotation detector. The respective centers of rotation of the power unit and the speed reducer are disposed on one and the same axis, and the rotation detector is disposed in a space defined by an outer peripheral portion of the speed reducer and an inner wall of the housing.

According to the present invention, there can be provided a compact, lightweight rotary table device, in which components of a rotary table are arranged differently from their conventional counterparts, and an electric discharge machine with the rotary table device.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
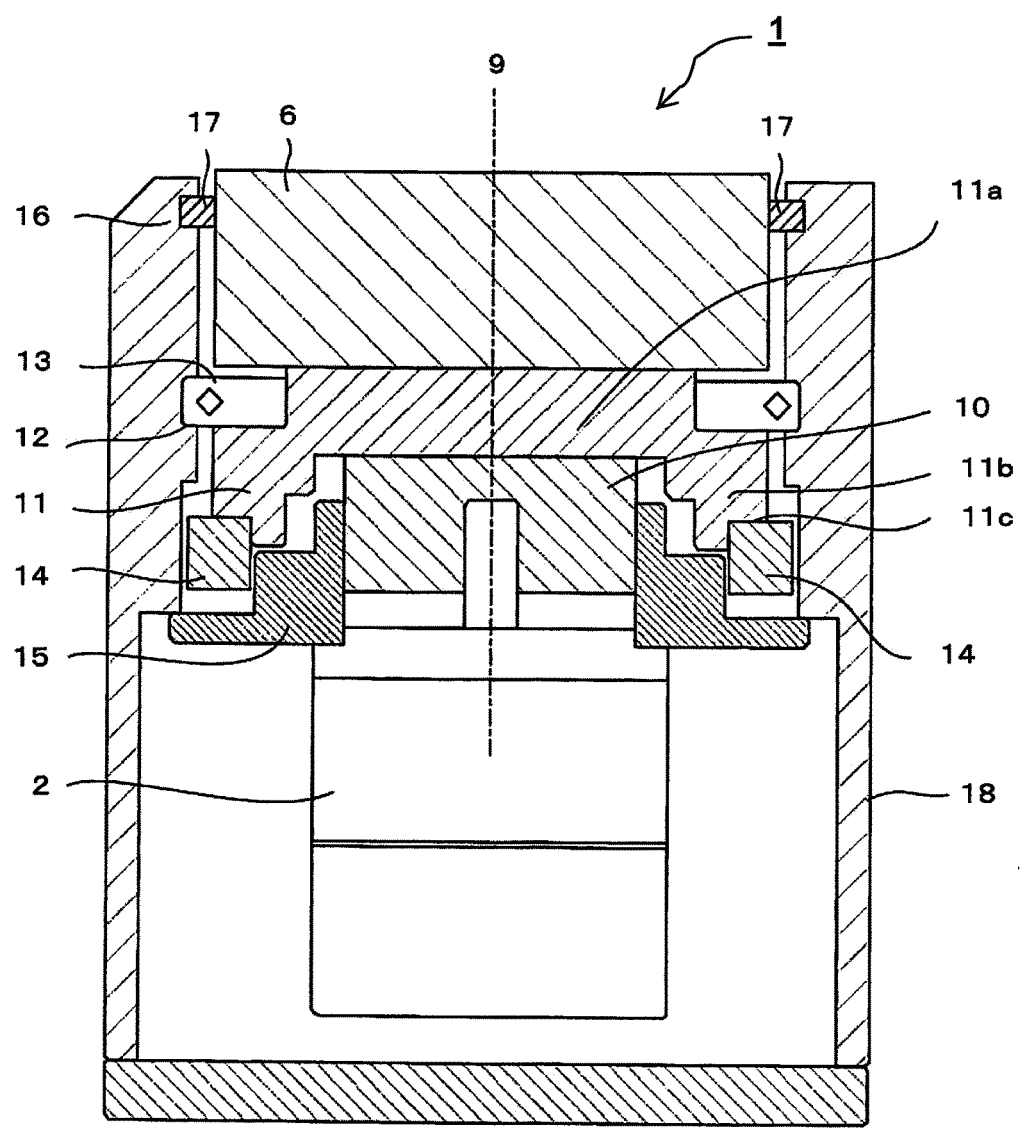
FIG. 1 is a view showing a first example of a rotary table of an electric discharge machine according to the present invention.

A first example of a rotary table of an electric discharge machine according to the present invention will first be described with reference to FIG. 1.

A housing 18 of a rotary table 1 accommodates a power unit 2, speed reducer 10, fixing member 15, shaft 11, bearing 13, face plate 6, and rotation detector 14.

The face plate 6 serves to fix a workpiece or a jig to which the workpiece is secured. To prevent a machining fluid or the like from getting into the housing 18, a sealing mechanism 16 formed of a seal member 17 is disposed in a gap between the housing 18 and the face plate 6. The power unit 2 comprises, for example, an electric motor. The fixing member 15 is secured to the housing 18, and the power unit 2 and the speed reducer 10 are attached to the fixing member 15.

The speed reducer 10 is connected to the power unit 2 and the speed-reduction side of the speed reducer 10 is connected to the shaft 11. Further, the face plate 6 is secured to the shaft 11. Thus, the rotary driving force of the power unit 2 is transmitted to the face plate 6 through the speed reducer 10 and the shaft 11. The speed reducer 10 connected to the power unit 2 reduces the rotational speed of the power unit 2. The power unit 2 and the speed reducer 10 are disposed in the housing 18 so that their respective centers of rotation are aligned on the same axis (E-axis 9).

A bearing support portion 12 is provided on one end side of the housing 18 of the rotary table 1. The bearing 13 has an annular structure and is supported for rotation about the central axis (E-axis 9) by the bearing support portion 12. The shaft 11 is secured to the bearing 13. The face plate 6 may be configured to be secured to the bearing 13. The shaft 11 comprises a central portion 11a including the center of rotation and an outer peripheral portion 11b around the central portion 11a. The shaft 11 is shaped so that its outer peripheral portion 11b projects from the central portion 11a toward the power unit 2, thereby covering the speed reducer 10. The rotation detector 14 is mounted on an end portion 11c of the outer peripheral portion 11b of the shaft 11. The rotation detector 14 is a conventional one in which a read head (not shown) is secured to the housing 18 and an object to be detected (rotation detector 14) is secured to the shaft 11 during use.

The shaft 11, face plate 6, and rotation detector 14 can rotate synchronously with the speed reducer 10. As this is done, the angular position of the face plate 6 can be accurately detected by the rotation detector 14. The face plate 6 can be positioned with high precision by feedback-controlling the power unit 2 based on an angular position signal output from the read head that detects the rotational state of the rotation detector 14.

By shaping the shaft 11, on which the rotation detector 14 is mounted, so as to cover the speed reducer 10, as described above, the rotation detector 14 can be disposed in a space between the outer peripheral portion (side surface) of the speed reducer 10 and the inner wall of the housing 18. Thus, an increase in the dimension of the rotary table 1 along the E-axis 9 can be suppressed, so that a compact, lightweight rotary table can be obtained at low cost.

Figure 2:
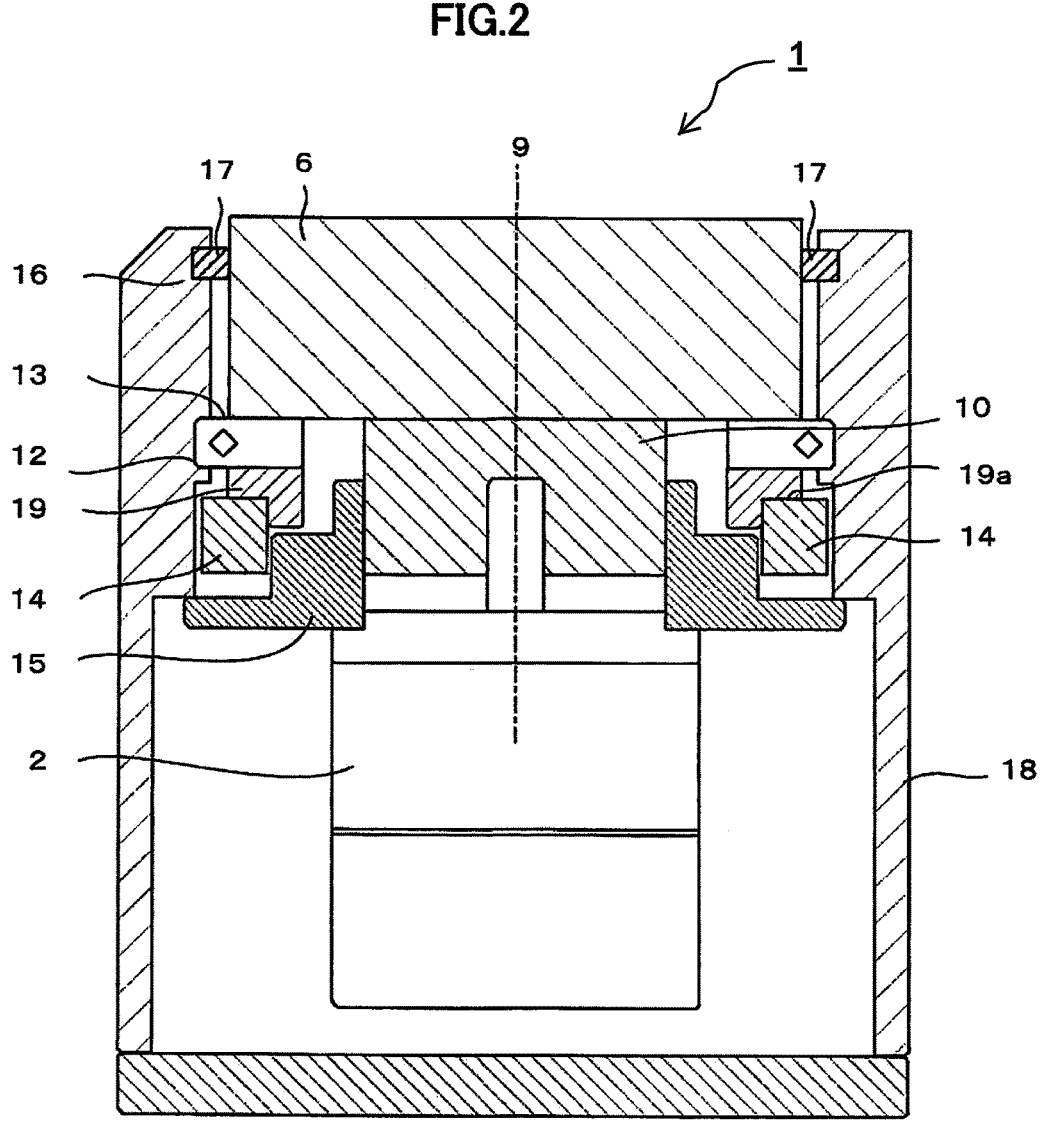
FIG. 2 is a view showing a second example of the rotary table of the electric discharge machine according to the present invention.

A second example of the rotary table of the electric discharge machine according to the present invention will now be described with reference to FIG. 2.

A face plate 6 is secured directly to a bearing 13. A speed reducer 10 is secured directly to the central part of the face plate 6. Since the bearing 13 has an annular structure, the speed reducer 10 can be moved toward and disposed in the bearing 13. A shaft 19 is attached to a side surface of the bearing 13 and a rotation detector 14 is secured to a rear end portion 19a of the shaft 19. The speed reducer 10 is connected to a power unit 2 and the speed-reduction side of the speed reducer 10 is connected to the face plate 6.

With this configuration, the dimension of the rotary table 1 along an E-axis 9 is smaller than in the first example shown in FIG. 1, so that a more compact rotary table can be obtained.

Figure 3:
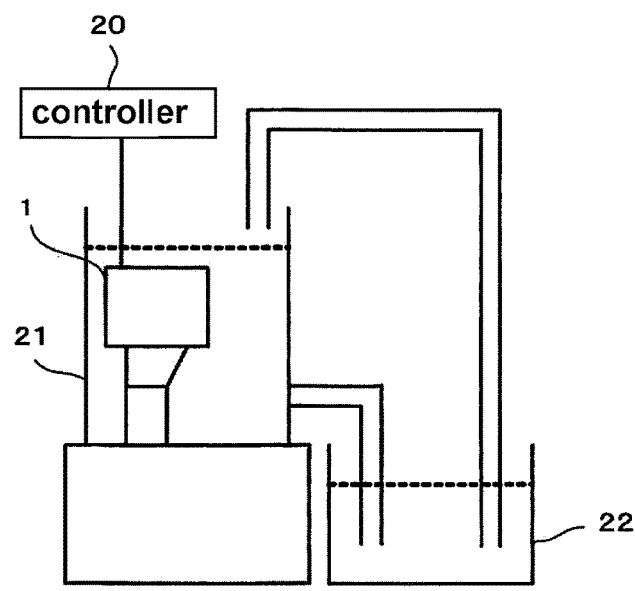
FIG. 3 is a view illustrating a principal part of the electric discharge machine with the rotary table according to the present invention.
Figure 4:
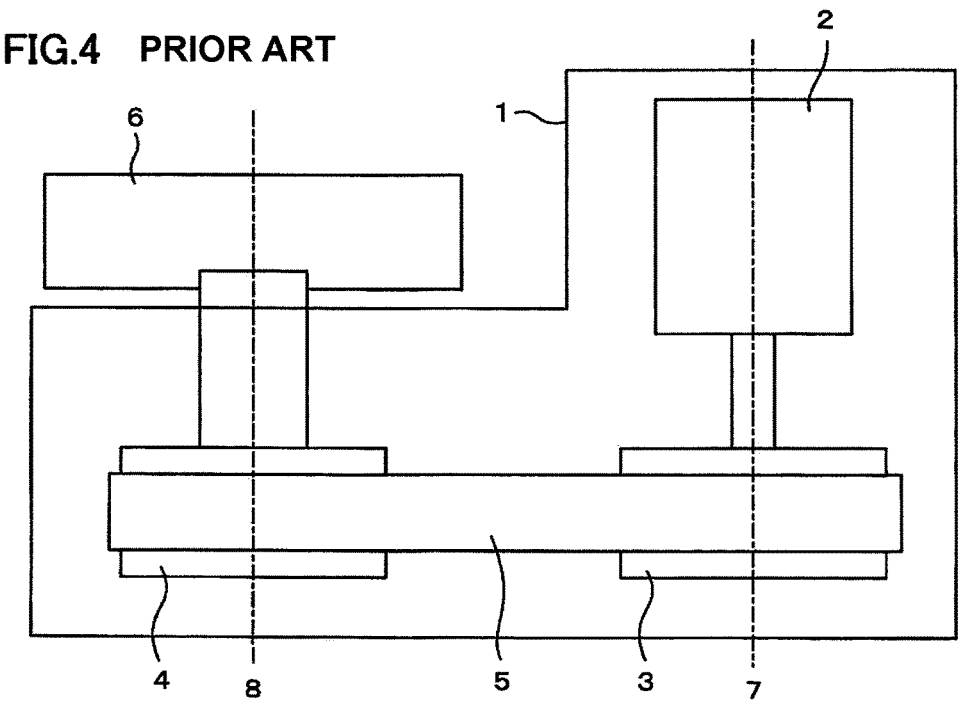
FIG. 4 is a view illustrating a prior art example of a rotary table of an electric discharge machine.

A principal part of the electric discharge machine with the rotary table 1 according to the present invention will now be described with reference to FIG. 3.

The electric discharge machine comprises a controller 20, machining tank 21, and clean water tank 22. The controller 20 controls the entire electric discharge machine including the rotary table 1 shown in FIG. 1 or 2. The controller 20 can receive a rotational position signal from the rotation detector 14 on the rotary table 1 and feedback-control the power unit 2 of the rotary table 1, thereby positioning the face plate 6 with high precision. The rotary table 1 (rotary table device) is disposed in the machining tank 21 in such a manner that the E-axis 9 extends in a vertical direction, horizontal direction, or some other direction. The workpiece is fixed on the face plate 6 of the rotary table 1 and subjected to electric discharge machining with the machining tank 21 filled with the machining fluid.

The invention claimed is:

1. An electric discharge machine, comprising:
   a machining tank;
   a rotary table disposed in the machining tank, wherein the rotary table comprises a face plate on which a workpiece is to be placed; and
   a controller,
   wherein the rotary table comprises:
      an electric motor configured to generate a driving force for rotating the face plate;

a speed reducer connected to the electric motor and configured to reduce a rotational speed of the electric motor;
a shaft to which the face plate is secured and which is connected to the speed reducer;
a bearing that supports at least one of the shaft and the face plate;
a rotation detector secured to the shaft and configured to detect a rotational position of the face plate; and
a housing that accommodates therein the electric motor, the speed reducer, the shaft, the bearing, and the rotation detector,
wherein a center of rotation of the electric motor and a center of rotation of the speed reducer are disposed on a same rotation axis,
wherein the shaft comprises:
a central portion positioned, along the rotation axis, between the face plate and the speed reducer, and
an outer peripheral portion which projects, in a direction along the rotation axis, from an outer periphery of the central portion toward the electric motor,
wherein the outer peripheral portion of the shaft surrounds the speed reducer,
wherein the rotation detector is secured to the outer peripheral portion of the shaft and is positioned, in a radial direction of the speed reducer, between the outer peripheral portion of the shaft and an inner wall of the housing, and
wherein the controller is operably connected to the rotary table and the rotation detector, and configured to, based on the rotational position of the face plate received from the rotation detector, feedback-control the electric motor to position the face plate during electric discharge machining.

2. An electric discharge machine, comprising:
a machining tank;
a rotary table disposed in the machining tank, wherein the rotary table comprises a face plate on which a workpiece is to be placed; and
a controller,
wherein the rotary table comprises:
an electric motor configured to generate a driving force for rotating the face plate;
a speed reducer connected with the face plate and the electric motor, and configured to reduce a rotational speed of the electric motor;
a bearing that supports the face plate;
a shaft secured to the bearing;
a rotation detector secured to the shaft and configured to detect a rotational position of the face plate; and
a housing that accommodates therein the electric motor, the speed reducer, the shaft, the bearing, and the rotation detector,
wherein a center of rotation of the electric motor and a center of rotation of the speed reducer are disposed on a same rotation axis,
wherein the shaft comprises:
a first portion attached to the bearing, and
a second portion which projects, in a direction along the rotation axis, from an inner periphery of the first portion toward the electric motor,
wherein the shaft, including the first portion and the second portion, surrounds the speed reducer,
wherein the rotation detector is secured to the shaft and is positioned, in a radial direction of the speed reducer, between the second portion of the shaft and an inner wall of the housing, and
wherein the controller is operably connected to the rotary table and the rotation detector, and configured to, based on the rotational position of the face plate received from the rotation detector, feedback-control the electric motor to position the face plate during electric discharge machining.

3. A rotary table device for rotating a workpiece, the rotary table device comprising:
a face plate on which the workpiece is to be placed;
an electric motor configured to generate a driving force for rotating the face plate;
a speed reducer connected to the electric motor and configured to reduce a rotational speed of the electric motor;
a shaft to which the face plate is secured and which is connected to the speed reducer;
a bearing that supports at least one of the shaft and the face plate;
a rotation detector secured to the shaft and configured to detect a rotational position of the face plate; and
a housing that accommodates therein the electric motor, the speed reducer, the shaft, the bearing, and the rotation detector,
wherein a center of rotation of the electric motor and a center of rotation of the speed reducer are disposed on a same rotation axis,
wherein the shaft comprises:
a central portion positioned, along the rotation axis, between the face plate and the speed reducer, and
an outer peripheral portion which projects, in a direction along the rotation axis, from an outer periphery of the central portion toward the electric motor,
wherein the outer peripheral portion of the shaft surrounds the speed reducer, and
wherein the rotation detector is secured to the outer peripheral portion of the shaft and is positioned, in a radial direction of the speed reducer, between the outer peripheral portion of the shaft and an inner wall of the housing.

4. A rotary table device for rotating a workpiece, the rotary table device comprising:
a face plate on which the workpiece is to be placed;
an electric motor configured to generate a driving force for rotating the face plate;
a speed reducer connected with the face plate and the electric motor, and configured to reduce a rotational speed of the electric motor;
a bearing that supports the face plate;
a shaft secured to the bearing;
a rotation detector secured to the shaft and configured to detect a rotational position of the face plate; and
a housing that accommodates therein the electric motor, the speed reducer, the shaft, the bearing, and the rotation detector,
wherein a center of rotation of the electric motor and a center of rotation of the speed reducer are disposed on a same rotation axis,
wherein the shaft comprises:
a first portion attached to the bearing, and
a second portion which projects, in a direction along the rotation axis, from an inner periphery of the first portion toward the electric motor,
wherein the shaft, including the first portion and the second portion, surrounds the speed reducer, and wherein the rotation detector is secured to the shaft and is positioned, in a radial direction of the speed reducer, between the second portion of the shaft and an inner wall of the housing.

5. The electric discharge machine according to claim 1, wherein the rotation detector is mounted on an end portion of the outer peripheral portion of the shaft.

6. The electric discharge machine according to claim 2, wherein the first and second portions of the shaft form an L shape, and the rotation detector is mounted in a corner of the L shape of the shaft.

7. The rotary table device according to claim 3, wherein the rotation detector is mounted on an end portion of the outer peripheral portion of the shaft.

8. The rotary table device according to claim 4, wherein the first and second portions of the shaft form an L shape, and the rotation detector is mounted in a corner of the L shape of the shaft.

\* \* \* \* \*